US008113535B2

(12) United States Patent
Pipkorn

(10) Patent No.: US 8,113,535 B2
(45) Date of Patent: Feb. 14, 2012

(54) SAFETY SYSTEM

(75) Inventor: Bengt Pipkorn, Sävedalen (SE)

(73) Assignee: Autoliv Development AB, Vargarda (SE)

( * ) Notice: Subject to any disclaimer, the term of this patent is extended or adjusted under 35 U.S.C. 154(b) by 888 days.

(21) Appl. No.: 12/085,279

(22) PCT Filed: Nov. 22, 2006

(86) PCT No.: PCT/EP2006/011185
§ 371 (c)(1),
(2), (4) Date: May 20, 2008

(87) PCT Pub. No.: WO2007/059934
PCT Pub. Date: May 31, 2007

(65) Prior Publication Data
US 2009/0048741 A1 Feb. 19, 2009

(30) Foreign Application Priority Data

Nov. 23, 2005 (DE) .......................... 10 2005 056 134

(51) Int. Cl.
*B60R 21/13* (2006.01)
*B60R 21/213* (2011.01)
(52) U.S. Cl. ........ 280/727; 280/784; 280/756; 280/748; 180/271
(58) Field of Classification Search ............. 296/187.06, 296/187.13, 187.03, 187.04, 187.08, 187.09, 296/187.1, 187.11, 187.12, 205; 280/784, 280/756, 730.2, 727, 728.1, 728.2, 743.1, 280/748, 751, 753; 180/274, 271; 293/107, 293/108
See application file for complete search history.

(56) References Cited

U.S. PATENT DOCUMENTS

| 4,036,039 | A | * | 7/1977 | Nakanishi ........................ 70/90 |
| 5,382,051 | A | * | 1/1995 | Glance ........................... 280/751 |
| 5,615,914 | A | | 4/1997 | Galbraith et al. |
| 5,709,502 | A | * | 1/1998 | Obermeyer ...................... 405/87 |
| 5,727,815 | A | * | 3/1998 | Smith ........................... 280/784 |
| 5,752,717 | A | | 5/1998 | Galbraith et al. |
| 5,839,777 | A | * | 11/1998 | Vlahovic ........................ 296/205 |
| 5,845,937 | A | * | 12/1998 | Smith ........................... 280/784 |
| 6,364,350 | B2 | * | 4/2002 | Hoagland .................... 280/730.2 |
| 6,467,563 | B1 | * | 10/2002 | Ryan et al. ..................... 180/274 |
| 2004/0049331 | A1 | | 3/2004 | Schneider |
| 2005/0206139 | A1 | * | 9/2005 | Mori et al. .................. 280/730.1 |

FOREIGN PATENT DOCUMENTS

| DE | 836 748 C | 4/1952 |
| DE | 20 20 360 A1 | 11/1971 |
| DE | 20 41 741 A1 | 2/1972 |
| DE | 196 24 328 A1 | 1/1998 |
| DE | 198 53 165 A1 | 6/2000 |

(Continued)

*Primary Examiner* — Paul N Dickson
*Assistant Examiner* — Keith Frisby
(74) *Attorney, Agent, or Firm* — Harness, Dickey & Pierce, P.L.C.

(57) ABSTRACT

The invention relates to a safety system for motor vehicles having sensor devices for detecting an accident and an apparatus for reinforcing a carrying construction (1) of a motor-vehicle roof (6), in particular the A, B or C column of the motor vehicle, which protrudes beyond a lower edge of a window opening (4), in which an inflatable reinforcing element (2) is deployed which is fastened to the carrying construction (1) and can be filled with gas via a gas generator (3) if corresponding sensor data are present. The invention also relates to a carrying construction (1) per se.

22 Claims, 3 Drawing Sheets

FOREIGN PATENT DOCUMENTS

| | | |
|---|---|---|
| DE | 199 630 68 | 6/2001 |
| DE | 102 03 287 A1 | 8/2003 |
| FR | 2 814 411 | 3/2002 |
| WO | WO-96/22199 A | 7/1996 |

* cited by examiner

SAFETY SYSTEM

CROSS REFERENCE TO RELATED APPLICATIONS

This application is a 371 U.S. National Stage of International Application No. PCT/EP2006/011185, filed Nov. 22, 2006. This application claims priority to German Patent Application No. 10 2005 056 134.9, filed Nov. 23, 2005, which application is herein expressly incorporated by reference.

The invention relates to a safety system for motor vehicles having sensor devices for detecting an accident and a device for reinforcing a supporting structure of a motor vehicle, particularly an A, B or C pillar of the motor vehicle, which protrudes beyond a lower edge of a window opening.

During a vehicle rollover, particularly the supporting structures of the roof, particularly the A-pillars, experience great stress. As a consequence, the A-pillars bend in the direction of a lower window edge or the vehicle chassis such that the vehicle roof is displaced in the direction of the vehicle passenger. This can result in an impairment of the survival space inside the passenger compartment.

In the development and configuration of supporting roof structures, such as A-pillars, a plurality of contradicting requirements must be fulfilled. The supporting structures must be sufficiently rigid to offer good protection for the vehicle passengers during a vehicle rollover, and at the same time they must be thin enough to provide a good view to the vehicle driver of the surrounding area. Likewise, with respect to increased design freedom, it is desirable not to design the supporting structures, which is to say the A, B or C pillars, too thick.

From FR 2,814,411, reinforcing bars for an A-pillar in a motor vehicle are known, which are connected to a control system and a pyrotechnic propellant. During a rollover, the pyrotechnic propellants are activated, and the reinforcing bars rotate into the hollow spaces inside the A-pillars by means of a lever mechanism.

The disadvantages are the added weight and the space that is required inside the A-pillar in order to accommodate the reinforcing bar.

Similar load scenarios can also be found on other supporting structures of the vehicle structure.

It is the object of the present invention to provide a safety system, which guarantees sufficient play for the design of the supporting structure, while providing sufficient rigidity at the same time.

According to the invention, this task is solved in that an inflatable reinforcing element is fastened to or configured on the supporting structure, wherein the element can be filled with gas via a gas generator and deploy if appropriate sensor data is present. Refinements of the invention are disclosed in the dependent claims.

Due to the inflatable reinforcing element, the cross-section of the supporting structure, particularly of the A-pillar, is enlarged such that the rigidity increases because of higher moments of inertia and resistance, as a result of which particularly the upper part of the A-pillar facing the roof is not, or less, deformed. In this way, it is possible to keep the thickness of the A-pillar above the lower window or windshield edge relatively narrow during normal vehicle operation, while the reinforcing effect unfolds during a rollover. The inflatable and deployable or unrollable reinforcing elements likewise provide improved protection during a frontal or side impact without a rollover. Alternatively, the reinforcing element can fold outward and thus increase the profile cross-section of the supporting structure, which likewise increases the moments of inertia and resistance.

In a preferred embodiment, the reinforcing elements are attached in the driving direction in front of and/or laterally on the supporting structure, preferably in a lower region of the supporting structure, which is to say in the region of the transition from the vehicle chassis to the window or windshield, since there the highest stress is to be expected during a rollover. Alternatively, the reinforcing elements are inwardly pressed or folded ribs or folds, which are folded out by increased inside pressure and thus enlarge the cross-section of the hollow profile, which forms the reinforcing element or the A-pillar. Due to the enlarged cross-section and the higher volume, rigidity is increased.

The reinforcing element is preferably made of a sheet metal body, which is fastened to the supporting structure in a folded or rolled manner, preferably on the outside or the outsides of the supporting structure. The reinforcing element can be folded in an accordion-like manner such that, upon deployment, it expands substantially in one plane, while in the case of a one-sided rigid fixation on a vehicle structure, the reinforcing element will deploy only in one direction, which is to say in the direction facing away from the vehicle structure. In addition to a folded design or similar compaction for deployment in one direction or dimension, it is provided that the reinforcing element is configured as an inflatable cushion, which deploys in a plurality of directions. In this way, the moments of resistance and inertia in a plurality of directions or orientations are increased such that reinforcement and improved stability are achieved not only in one load direction. The volume of the reinforcing element is increased when the gas generator is started.

In the inflated state, the reinforcing element can extend between the lower edge of the window opening and the supporting structure and, in the inflated state, has a cross-section that is enlarged, particularly doubled, compared to the non-inflated state.

The gas generator can be disposed in any arbitrary location inside the vehicle design, preferably inside the supporting structure or directly in the vicinity of the reinforcing element, beneath the lower edge of the window opening, for example in the lower region of the A, B or C pillar underneath the window opening.

The gas generator can be configured as a pyrotechnic propellant or as a gas reservoir for a compressed gas, and is activated in the event of an accident or if a directly imminent accident is sensed. For this purpose, it is provided that the sensor device is configured as a pre-crash sensor device, which detects a quickly approaching object and ignites the propellants for the gas generator.

In order to be able to replace the reinforcing elements in the event of an accidental triggering of the gas generator and the subsequent deployment, a refinement of the invention provides that the reinforcing element is fastened in a holder on the supporting structure or vehicle structure. A simple execution of the fastening provides that the holder is configured as a groove or rail, in or on which the reinforcing element is inserted, pushed or clamped. In this way, it is possible to fix the reinforcing element reversibly to the vehicle structure in that the reinforcing element is anchored to the vehicle structure via a coupling element configured thereon or attached thereto. To this end, the coupling element comprises form-fitting elements, which are configured to correspond to form-fitting elements in or on the holder such that secure fastening of the reinforcing element can be performed without complex installation.

The invention also relates to a supporting structure comprising an inflatable reinforcing element as such.

The invention will be explained in more detail hereinafter with reference to the attached figures, wherein.

Figure 1:
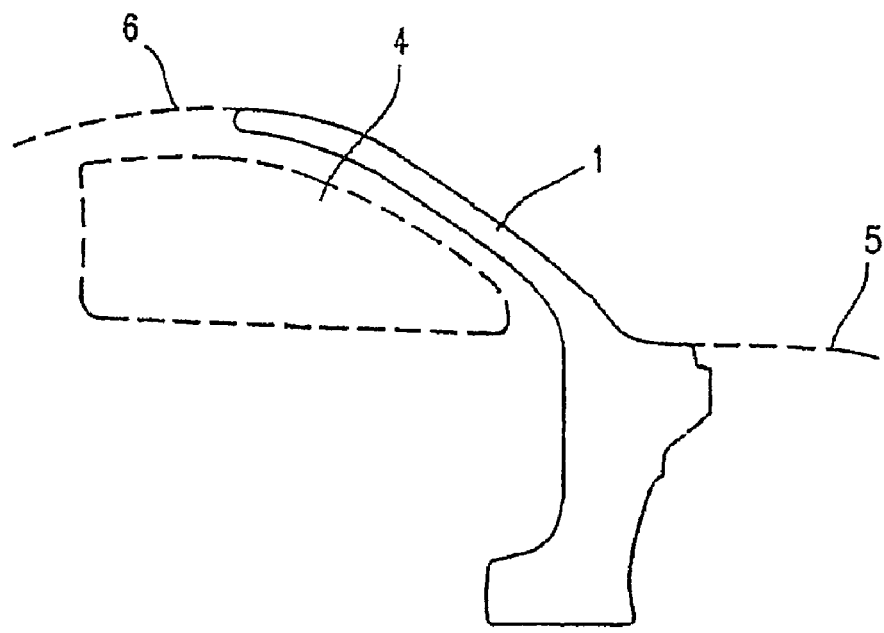
FIG. 1 is a schematic illustration of a conventional supporting structure in a motor vehicle in a starting state.

FIG. 1 shows a schematic illustration of a supporting structure 1 in the shape of an A-pillar. An A-pillar 1 encompasses the connection between a vehicle roof and the hood in the front region of a passenger compartment. The A-pillar can extend to far beneath the hood up to the vehicle chassis.

In addition to the A-pillar, further supporting structures are provided in a conventional motor vehicle, for example the B-pillar, which forms a connection between the vehicle bottom and the vehicle roof in the center of the passenger compartment. Some vehicle types, such as coupes or convertibles, in general have no B-pillar. A C-pillar is a connection between the vehicle roof and the rear fenders or trunk lid on the vehicle tail; in the event of an accident with rollover, all supporting structures or vehicle pillars perform the life-saving function of stabilizing the passenger compartment and preventing vertical deformations. In addition, the vehicle pillars must absorb forces during a side impact.

As is shown in FIG. 1, the A-pillar 1 extends from the hood, which is only hinted at, up to the vehicle roof 6, which is also only hinted at. The A-pillar 1 forms either the front part of a window section 4 or the stop for a window frame having a window section 4, which is fastened to the vehicle door.

During an accident with rollover, very high vertical forces can act on the A-pillar 1. If these forces exceed a certain amount, the supporting structure 1 fails and collapses, so that the space inside the passenger compartment is reduced. Such a collapse typically occurs at the base of the A-pillar 1 on the transition from the window section 4 to the section of the supporting structure 1 extending beneath the hood 5. The moments occurring there are so high due to the lever arm that the likelihood of failure is greater here.

Figure 2:
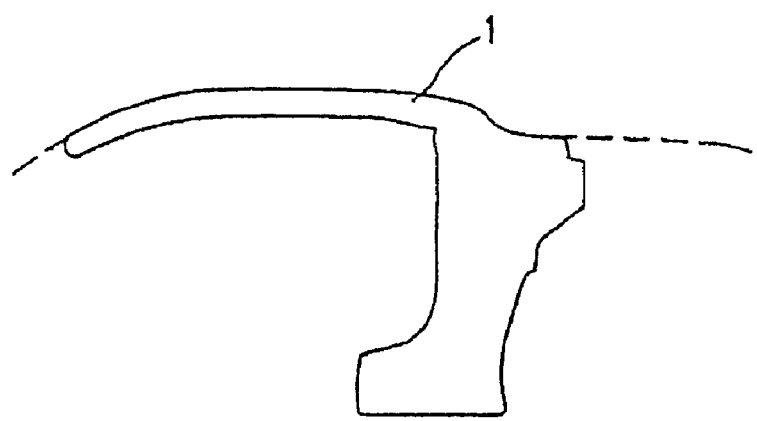
FIG. 2 is a supporting structure according to FIG. 1 in a deformed state.

FIG. 2 shows an A-pillar 1 after deformation, which resulted in a massive reduction in height of the passenger compartment. The A-pillar 1 is buckled approximately at the height of the hood 5 such that the passenger compartment remains only up to approximately the region of the waistline.

Figure 3:
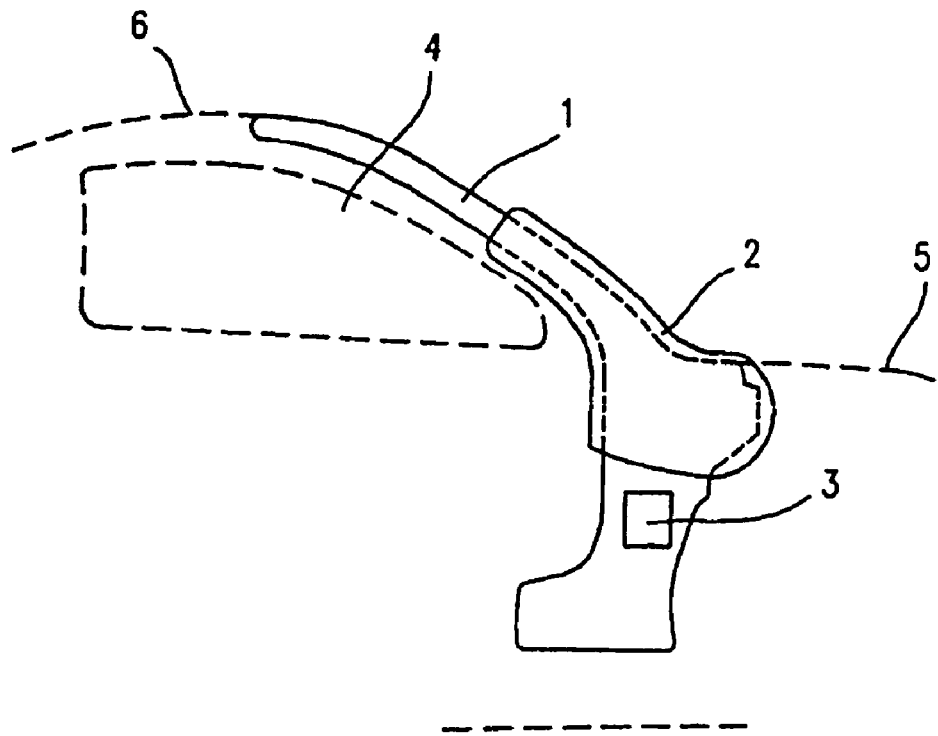
FIG. 3 is a schematic illustration of a supporting structure having an inflated reinforcing element prior to deformation.

FIG. 3 shows the inventive safety system having a supporting structure 1, wherein a gas generator is provided in the lower region, beneath the hood 5. In the transition region from the section disposed beneath the hood 5 to the connecting member to the vehicle roof 6, an inflatable reinforcing element 2 is provided, which is shown in the activated state. While the reinforcing element 2 in the non-activated state corresponds to the usual shape illustrated by the dotted lines, following the activation of the gas generator 3 the reinforcing element 2 deploys and provides an enlarged cross-section of the reinforcing element 1. This increase in the cross-section results in reduced moments of inertia and resistance of the supporting structure 1, which is typically configured as a hollow profile, such that overall greater strength and improved rigidity of the design can be achieved.

Figure 4:
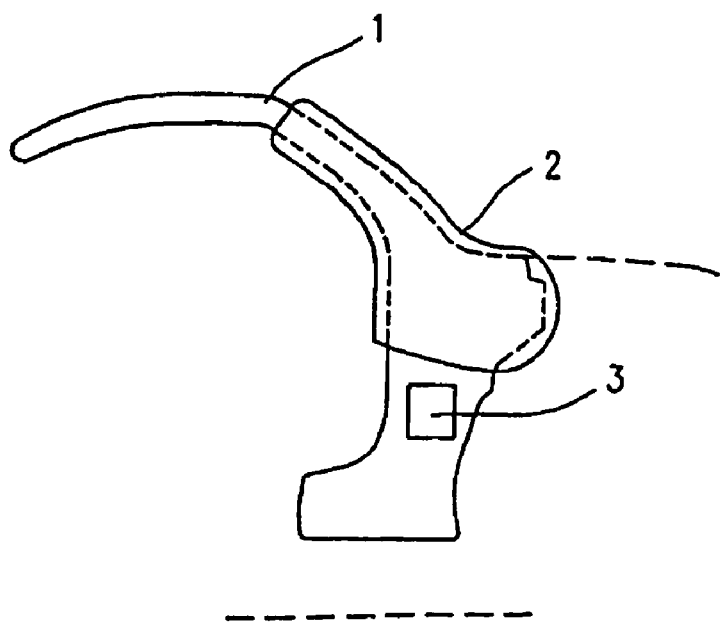
FIG. 4 is a supporting structure according to FIG. 3 after deformation.

FIG. 4 shows the deformation of a supporting structure 1 reinforced in this way. It is apparent that a deformation only starts at the upper end of the reinforcing element 2, so that, compared to a conventional design, the passenger compartment is maintained in the vertical direction in a larger size. The reinforcing element 2 can surround the supporting structure 1, or it can be disposed in front of or laterally to the supporting structure 1 viewed in the driving direction. Likewise, it is possible to dispose the reinforcing element 2 such that it extends in a window section 4 in the front door region, thus bringing about support for the supporting structure 1. The important aspect is that the reinforcing element 2 is disposed in the lower region of the supporting structure 1, which is to say in the region of the transition from the hood 5 into the connecting brace of the roof structure 1, which is to say in the region of the lower edge of the window opening 4, because there the highest bending torque occurs due to the lever arm of the A-pillar 1.

For space and weight distribution reasons, the gas generator 3 is disposed under the hood 5 inside the supporting structure 1, which is configured as a hollow profile. The gas generator 3 is particularly configured as a pyrotechnic propellant or as a gas reservoir for compressed gas and is activated by sensor devices, particularly pre-crash sensor devices. After the gas generator 3 is activated, the cross-section of the reinforcing element 2, and therefore also the supporting structure 1 compared to the non-inflated state, increases, with the cross-section preferably being doubled. The reinforcing element 2 can be welded to the supporting structure 1 and made of a folded metal cushion or a rib, which is pressed outward and thus enlarges the surface of the supporting cross-section of the supporting structure 1. In this way, it is ensured that during normal operation a sleek silhouette of the supporting structure 1 is maintained, resulting in minimized obstruction to the field of vision. In the event of an accident, the inwardly folded ribs or components of the A-pillar 1 are folded out, or the folded cushions are inflated, in order to increase the cross-section of the supporting structure 1 and reinforcing element 2 and bring about reinforcement.

Figure 5:
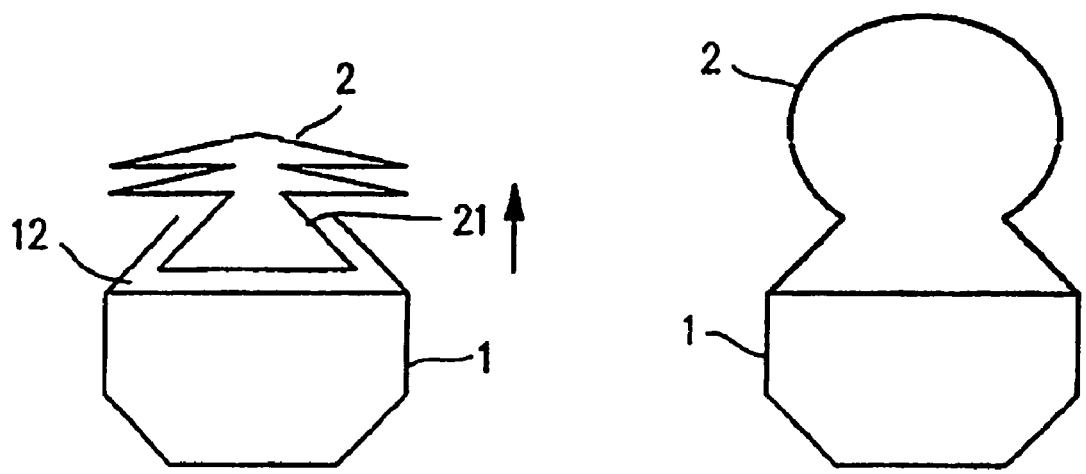
FIG. 5 is an installation situation of a reinforcing element.

FIG. 5 shows a cross-sectional illustration of an installation situation of a reinforcing element 2 on a supporting structure 1 or vehicle structure 1. The vehicle structure 1 is configured as an A-pillar, on which a holder 12 in the shape of a trapezoidal rail is provided or configured on the side facing away from the driving direction. This holder 12 has an undercut as a form-fitting element, which is provided to receive the reinforcing element 2. A coupling element 21 is configured on or fastened to the reinforcing element 2, the coupling element being designed to correspond to the holder 12. The reinforcing element 2, together with the coupling element 21, is inserted in the holder 12 along the longitudinal extension of the vehicle structure 1 or A-pillar, and, due to the cross-sectional design of both the holder 12 and the coupling element 21, is held positively in the deployment direction. A special fastening or fixing element may be provided against a displacement of the reinforcing element 2 along the longitudinal extension of the A-pillar 1 and/or holder 12. FIG. 5 is a schematic illustration of the installation situation, with no, or only very little, play being provided between the coupling element 21 and the holder 12 in the installation state.

After the gas generator has been started, the reinforcing element 2 is filled with gas, and the folded region is increased in volume such that a contour is achieved as that shown in the right illustration of FIG. 5. The reinforcing element 2 then has a partial circular section with a trapezoidal section extending thereon. Due to the increase in volume, the moments of inertia and resistance grow, and the vehicle structure 1 or supporting structure 1 is reinforced. In the deployed state, the reinforcing element 2 has a key hole-like contour, while in the folded state the reinforcement element 2 is folded flat. Thus, an expansion occurs in a plurality of orientations such that the reinforcing element 2 is configured as an inflatable cushion. Alternatively, the reinforcing element 2 may also be folded in an accordion-like manner and then expands only in one direction, in the present case away from the supporting structure 1 in the direction of the arrow. This would primarily result in increased rigidity, against a load in the direction of the arrow.

Due to the configuration of a coupling element 21, by reinforcing certain parts it is possible to easily and securely mount the reinforcing element 2 inside the vehicle structure, in order to improve the rigidity and safety of vehicles during accidents. The initially collapsed, particularly folded reinforcing elements 2 are deployed by applying internal gas pressure. In the mounted state, the reinforcing elements are easy to install, and in the event of triggering due to the signals of a pre-crash sensor without subsequent accident, they are easy to replace. The invention can be used on different parts of the vehicle structure, for example in door pillars, and particularly in supporting roof structures. In the event of an accident, due to the positive accommodation of the coupling element 21 inside the holder 12, a stable association and firm coupling to the supporting structure 1 is achieved. The firm coupling is increased by the expansion of the reinforcing element 2, and consequently also of the coupling element 21, in the event the gas generator is triggered. In principle, it is also possible to fasten components, to which internal gas pressure is applied, to the vehicle structure as described above, even if these do not deploy and their volume is increased.

The invention claimed is:

1. A safety system for a motor vehicle comprising:
a vehicle pillar adapted to support at least a portion of a roof of the motor vehicle, the vehicle pillar carrying a rail defining an opening; and
a metal inflatable reinforcing element coupled to an exterior of the vehicle pillar, the metal inflatable reinforcing element inflatable to at least increase a cross-sectional area thereof, the metal inflatable reinforcing element including a first portion retained within the rail and a second portion disposed outside of the rail;
wherein the vehicle pillar is coupled between the roof of the motor vehicle and a chassis of the motor vehicle, and the vehicle pillar defines a longitudinal extension between the roof and a hood of the motor vehicle; and
wherein the second portion defines a folded region expandable upon inflation from a folded orientation to an expanded orientation.

2. The system of claim 1, wherein the first portion of the metal inflatable reinforcing element defines a coupling element that mates with the opening defined by the rail to retain the metal inflatable reinforcing element in a deployment direction.

3. The system of claim 1, wherein the rail is a trapezoidal rail and the first portion of the inflatable reinforcing element is a triangular projection.

4. The system of claim 1, further comprising:
a gas generator responsive to a signal to generate an inflation gas to inflate the metal inflatable reinforcing element, the gas generator disposed within a cavity covered by the hood of the motor vehicle.

5. The system of claim 4, wherein the metal inflatable reinforcing element comprises a folded metal cushion in fluid communication with the gas generator to inflate in a plurality of directions upon receipt of the gas.

6. The system of claim 4, wherein the metal inflatable reinforcing element comprises a folded metal cushion in fluid communication with the gas generator and folded in an accordion-like manner such that the metal inflatable reinforcing element deploys in one plane upon receipt of the gas.

7. The system of claim 4, wherein when inflated the metal inflatable reinforcing element extends between a lower edge of a window opening in the motor vehicle and the vehicle pillar.

8. The system of claim 4, wherein the metal inflatable reinforcing element is flat against the vehicle pillar in a un-inflated state, and has a shape including a partially circular portion and a trapezoidal portion when inflated.

9. The system of claim 1, wherein the metal inflatable reinforcing element inflates to surround the vehicle pillar.

10. The system of claim 1, wherein the rail carried by the pillar is trapezoidal in cross section including a closed first side adjacent the pillar and an opposing, open second side, and further wherein the first portion of the metal inflatable reinforcing element is generally triangular with a base having a length greater than the second side.

11. A safety system for a motor vehicle comprising:
a vehicle pillar coupled between a roof of the motor vehicle and a chassis of the motor vehicle to support at least a portion of a roof of the motor vehicle, the vehicle pillar defining a longitudinal extension between the roof and a hood of the motor vehicle;
a holder coupled to an exterior of a portion of the longitudinal extension, the holder defining an open channel;
an inflatable reinforcing element received within the holder, the inflatable reinforcing element inflatable to reinforce at least the portion of the longitudinal extension of the vehicle pillar to absorb a bending torque present on the longitudinal extension in a roll-over collision, the inflatable reinforcing element including a first portion retained within the channel of the holder and a second portion disposed outside of the channel; and
a gas generator responsive to a signal to generate an inflation gas to inflate the inflatable reinforcing element, the gas generator disposed within a cavity covered by the hood of the motor vehicle.

12. The system of claim 11, wherein the inflatable reinforcing element comprises a folded metal cushion in fluid communication with the gas generator to inflate in a plurality of directions upon receipt of the gas.

13. The system of claim 11, wherein the inflatable reinforcing element comprises a folded metal cushion in fluid communication with a gas generator and folded in an accordion-like manner such that the metal inflatable reinforcing element deploys in one plane upon receipt of a gas.

14. The system of claim 11, wherein the first portion of the inflatable reinforcing element mates with the holder to retain the inflatable reinforcing element in a deployment direction.

15. The system of claim 14, wherein the holder is a trapezoidal rail and the first portion of the inflatable reinforcing element is a triangular projection.

16. The system of claim 11, wherein when inflated the inflatable reinforcing element extends between a lower edge of a window opening in the motor vehicle and the vehicle pillar.

17. The system of claim 11, wherein the inflatable reinforcing element is flat against the vehicle pillar in a un-inflated state, and has a shape including a partially circular portion and a trapezoidal portion when inflated.

18. The system of claim 11, wherein the holder is trapezoidal in cross section including a closed first side adjacent the pillar and an opposing, open second side, and further wherein the first portion of the metal inflatable reinforcing element is generally triangular with a base having a length greater than the second side.

19. A safety system for a motor vehicle comprising:
- a vehicle pillar coupled between a roof of the motor vehicle and a chassis of the motor vehicle to support at least a portion of a roof of the motor vehicle, the vehicle pillar defining a longitudinal extension between the roof and a hood of the motor vehicle;
- a holder coupled to an exterior of a portion of the longitudinal extension, the holder defining an open channel;
- a gas generator responsive to a signal to generate an inflation gas, the gas generator disposed beneath the hood of the motor vehicle;
- a metal inflatable reinforcing element in fluid communication with the gas generator to inflate and deploy upon receipt of the inflation gas, the metal inflatable reinforcing element including a coupling element retained within the channel to positively hold the metal inflatable reinforcing element in a deployment direction; and
- wherein the deployment of the metal inflatable reinforcing element reinforces the portion of the longitudinal extension of the vehicle pillar and at least a portion of the vehicle pillar disposed between the hood of the motor vehicle and the chassis of the motor vehicle.

20. The system of claim 19, wherein the holder is trapezoidal in cross section including a closed first side adjacent the pillar and an opposing, open second side, and further wherein the coupling element of the metal inflatable reinforcing element is generally triangular with a base having a length greater than the second side.

21. A safety system for a motor vehicle comprising:
- a vehicle pillar adapted to support at least a portion of a roof of the motor vehicle, the vehicle pillar carrying a rail defining an opening; and
- a metal inflatable reinforcing element coupled to an exterior of the vehicle pillar, the metal inflatable reinforcing element inflatable to at least increase a cross-sectional area thereof, the metal inflatable reinforcing element including a first portion retained within the rail and a second portion disposed outside of the rail;
- wherein the second portion defines a folded region expandable upon inflation from a folded orientation to an expanded orientation; and
- a gas generator responsive to a signal to generate an inflation gas to inflate the metal inflatable reinforcing element, the gas generator disposed within a cavity covered by the hood of the motor vehicle.

22. A safety system for a motor vehicle comprising:
- a vehicle pillar coupled between a roof of the motor vehicle and a chassis of the motor vehicle to support at least a portion of a roof of the motor vehicle, the vehicle pillar defining a longitudinal extension between the roof and a hood of the motor vehicle;
- a holder coupled to an exterior of a portion of the longitudinal extension, the holder defining an open channel;
- an inflatable reinforcing element received within the holder, the inflatable reinforcing element inflatable to reinforce at least the portion of the longitudinal extension of the vehicle pillar to absorb a bending torque present on the longitudinal extension in a roll-over collision, the inflatable reinforcing element including a first portion retained within the channel of the holder and a second portion disposed outside of the channel; and
- a gas generator responsive to a signal to generate an inflation gas to inflate the inflatable reinforcing element, the gas generator disposed within a cavity covered by the hood of the motor vehicle;
- wherein the inflatable reinforcing element comprises a folded metal cushion in fluid communication with a gas generator and folded in an accordion-like manner such that the metal inflatable reinforcing element deploys in one plane upon receipt of a gas.

* * * * *